US006561799B2

(12) United States Patent
Baudry et al.

(10) Patent No.: US 6,561,799 B2
(45) Date of Patent: May 13, 2003

(54) SEALING BOX FOR A CHAMBER FOR CONTINUOUSLY TREATING A THIN STRIP PRODUCT, IN PARTICULAR FOR A FURNACE FOR CONTINUOUSLY CARBONIZING A FIBER SUBSTRATE

(75) Inventors: Yvan Baudry, Hebron, KY (US); Hervé Evrard, Le Haillan (FR); Michel Laxague, Bordeaux Cauderan (FR)

(73) Assignee: Snecma Propulsion Solide, Le Haillan Cedex (FR)

( * ) Notice: Subject to any disclaimer, the term of this patent is extended or adjusted under 35 U.S.C. 154(b) by 0 days.

(21) Appl. No.: 10/149,159

(22) PCT Filed: Dec. 5, 2000

(86) PCT No.: PCT/FR00/03386

§ 371 (c)(1), (2), (4) Date: Jun. 6, 2002

(87) PCT Pub. No.: WO01/42542

PCT Pub. Date: Jun. 14, 2001

(65) Prior Publication Data

US 2002/0182556 A1 Dec. 5, 2002

(30) Foreign Application Priority Data

Dec. 6, 1999 (FR) .............................................. 99 15332

(51) Int. Cl.[7] .................................................... F27B 9/28
(52) U.S. Cl. ........................................................ 432/259
(58) Field of Search .............................. 432/8, 59, 121, 432/128

(56) References Cited

U.S. PATENT DOCUMENTS

| | | |
|---|---|---|
| 2,199,521 A | 5/1940 | Doderer |
| 2,977,106 A | 3/1961 | Duff |
| 3,704,872 A * | 12/1972 | Klein .......................... 432/59 |

(List continued on next page.)

FOREIGN PATENT DOCUMENTS

| | | |
|---|---|---|
| DE | 198 46 749 A | 4/2000 |
| EP | 0 075 438 A | 3/1983 |
| GB | 1 479 886 A | 7/1977 |

OTHER PUBLICATIONS

Patent Abstracts of Japan, vol. 006, No. 214 (C–131), Oct. 27, 1982; and JP 57 117624 A (Mitsubishi Rayon KK), Jul. 22, 1982—Abstract.

Patent Abstracts of Japan, vol. 10, No. 94 (C–338) ‘2151’, Apr. 11, 1986; and JP 60 244713 A (Daido Tokushuko KK), Nov. 9, 1985—Abstract.

*Primary Examiner*—Gregory Wilson
(74) *Attorney, Agent, or Firm*—Weingarten, Schurgin, Gagnebin & Lebovici LLP

(57) ABSTRACT

A sealing box for a chamber for continuously treating a thin strip product, in particular for a furnace for continuously carbonizing a fiber substrate.

The sealing box comprises: a longitudinal passage (12) opening out from the box via a first end (12*b*) for connection to an inlet or an outlet of a treatment chamber (2) and via a second end (12*a*), opposite from the first; a support surface (14*a*) inside the passage, on which a strip product (T) can travel between the ends of the box; and static sealing means (30) acting by making contact with the strip product travelling along the passage on the support surface. The static sealing means comprise at least one inflatable gasket (32) placed across the passage (12) above the support surface (14*a*), and dynamic sealing means (40) are also provided in the passage between the second end (12*a*) of the box and the static sealing means, the dynamic sealing means comprising means (52, 56) for injecting gas into at least one chamber (42, 46) formed in the passage. The sealing box is suitable in particular for a furnace that produces carbon fiber cloth by continuously carbonizing a cloth made of a carbon precursor.

21 Claims, 3 Drawing Sheets

U.S. PATENT DOCUMENTS

| | | | | | |
|---|---|---|---|---|---|
| 4,681,536 | A | | 7/1987 | Jansen | |
| 5,009,016 | A | * | 4/1991 | LePisto et al. | 34/421 |
| 5,193,996 | A | * | 3/1993 | Mullen | 432/59 |
| 5,997,287 | A | * | 12/1999 | Permentier et al. | 432/59 |

* cited by examiner

SEALING BOX FOR A CHAMBER FOR CONTINUOUSLY TREATING A THIN STRIP PRODUCT, IN PARTICULAR FOR A FURNACE FOR CONTINUOUSLY CARBONIZING A FIBER SUBSTRATE

FIELD OF THE INVENTION

The invention relates to installations for continuously treating a strip product such as a film, web, cloth, or other fiber or non-fiber thin substrate.

A particular field of application of the invention is continuously treating strip products in a furnace in order to form a deposit thereon, to perform surface treatment thereon, or to perform carbonization thereof. The invention relates particularly, but not exclusively, to continuously carbonizing fiber substrates such as cloth or web made of fiber or yarn.

BACKGROUND OF THE INVENTION

Installations are known for producing carbon fiber cloth by continuously carbonizing cloth made of carbon-precursor fibers. Reference can be made in particular to Russian patent No. RU 2 005 829.

The cloth to be carbonized, e.g. made of cellulose fibers, travels continuously through a furnace in which the carbon precursor is transformed by pyrolysis so that a carbon fiber cloth is recovered continuously from the outlet of the furnace.

Pyrolysis is performed under an inert atmosphere by injecting a gas, e.g. nitrogen, into inlet and outlet zones at the ends of the furnace. The inert gas is extracted together with the effluent of the pyrolysis via chimneys leading away from various zones of the furnace.

The inside of the furnace must be sealed so as to be sure that no pyrolysis effluent can escape to the outside through the inlet or the outlet of the furnace and so as to ensure that no air can penetrate into the inside of the furnace. Effluent escaping from the inlet or the outlet of the furnace would not only make it more difficult to eliminate the effluent, but would also pollute the cloth by allowing tars conveyed by the effluent to condense or deposit thereon. Air penetrating into the furnace would oxidize the cloth and, by cooling the product could also give rise to undesirable condensation of pyrolysis effluent.

Good sealing can be provided by pressing a lip or a roller against the cloth. Nevertheless that can sometimes lead to high levels of friction, thereby inducing tension in the cloth. However, during carbonization, the cloth can shrink considerably. It can shrink substantially freely in the weft direction, but tension applied by friction, e.g. using rollers, prevents shrinkage from taking place freely in the warp direction. This results in excessive weft deformation in the resulting cloth.

Good sealing can also be provided by a dynamic seal formed by a flow of inert gas, such as a nitrogen seal. Nevertheless, that would disturb the aerodynamics inside the furnace and would also cool the pyrolysis effluent, thereby leading to the above-mentioned drawbacks. In addition, such a solution is unsuitable when particular pressure conditions need to be maintained inside the furnace.

OBJECT AND SUMMARY OF THE INVENTION

An object of the invention is to remedy those drawbacks, and more generally, to provide a sealing box for an enclosure for continuously treating a strip product while providing excellent sealing:

without disturbing the internal aerodynamics of the enclosure;

while maintaining the inside of the enclosure at a desired pressure; and without exerting tension on the strip product that could lead to its behavior or its appearance being disturbed.

According to the invention, this object is achieved by a sealing box comprising:

a longitudinal passage opening out from the box via a first end for connection to an inlet or an outlet of the enclosure, and via a second end, opposite from the first;

a support surface inside the passage, on which a strip product can travel between the ends of the box; and static sealing means acting by coming into contact with the strip product travelling along the passage on the support surface;

in which box, according to the invention:

the static sealing means comprise at least one inflatable gasket placed across the passage, above the support surface; and dynamic sealing means are also provided in the passage between the second end of the box and the static sealing means, the dynamic sealing means comprising means for injecting gas into at least one chamber formed in the passage.

The combination of static sealing means and of dynamic sealing means makes it possible to use static sealing means that exert minimum friction force on the travelling strip product. Thus, the inflatable gasket is preferably inflated to a pressure that exceeds atmospheric pressure by less than 500 Pascals (Pa). It is also made of a material over which the thin products can slide with a minimum amount of friction, e.g. a silicone-coated cloth.

Thus, with a sealing box of the invention, it is possible to limit the tension exerted on the travelling strip product. For a strip product in the form of a cloth that is subjected to carbonization inside the enclosure, the difference between the substantially free shrinkage in the weft direction (expressed as a percentage) and the shrinkage in the warp direction (also expressed in percentage) can be restricted to a value of less than 5%.

The dynamic sealing means advantageously comprise means for injecting gas into a chamber defined by the inflatable gasket and a wall extending across the passage. The dynamic sealing means preferably comprise a plurality of adjacent chambers separated from one another by walls extending across the passage, each chamber being provided with its own gas injection or extraction opening. In this configuration, an extraction chamber is situated between two injection chambers.

Advantageously, the or each wall defining a chamber is provided with a flexible bib at its end adjacent to the path of cloth along the passage, e.g. a bib of silicone-coated cloth. The bib does not perform a static sealing function, and as a result it does not exert any significant force on the strip product travelling along the passage.

According to a feature of the invention, the inflatable flexible gasket is made up of a plurality of adjacent sections aligned side-by-side across the passage, each section being provided with its own inflation means so as to make it possible to adjust the inflation pressure in each section of the gasket independently.

As a result, it is possible to exert a force that varies in the transverse direction on the strip product. When the strip product is cloth that is being subjected to carbonization, that makes it possible to control straightness of grain by compensating for the cloth shifting out of register during carbonization, i.e. for the deformation to which the cloth is subject by weft curvature.

BRIEF DESCRIPTION OF THE DRAWINGS

The invention will be better understood on reading the following description given by way of non-limiting indication and with reference to the accompanying drawings, in which.

DETAILED DESCRIPTION OF PREFERRED EMBODIMENTS

In the description below, an embodiment of the invention is described in its application to continuously carbonizing cloth. As stated above, the invention is nevertheless applicable more generally to any strip product which is treated continuously in an enclosure. The term "strip product" is used herein to mean a product such as a film, or a thin substrate, optionally made of fibers. In addition to cloth, fiber substrates can be constituted by unidirectional or multidirectional fiber webs. In addition, the invention is more generally applicable to strip products that are to be subjected to various types of treatment in an enclosure, for example having deposits formed thereon, being subjected to surface treatment, or to physical or chemical transformation, whenever there is a need more particularly to avoid applying any significant tension to the strip product and to avoid disturbing the aerodynamic and pressure conditions inside the enclosure.

Figure 1:
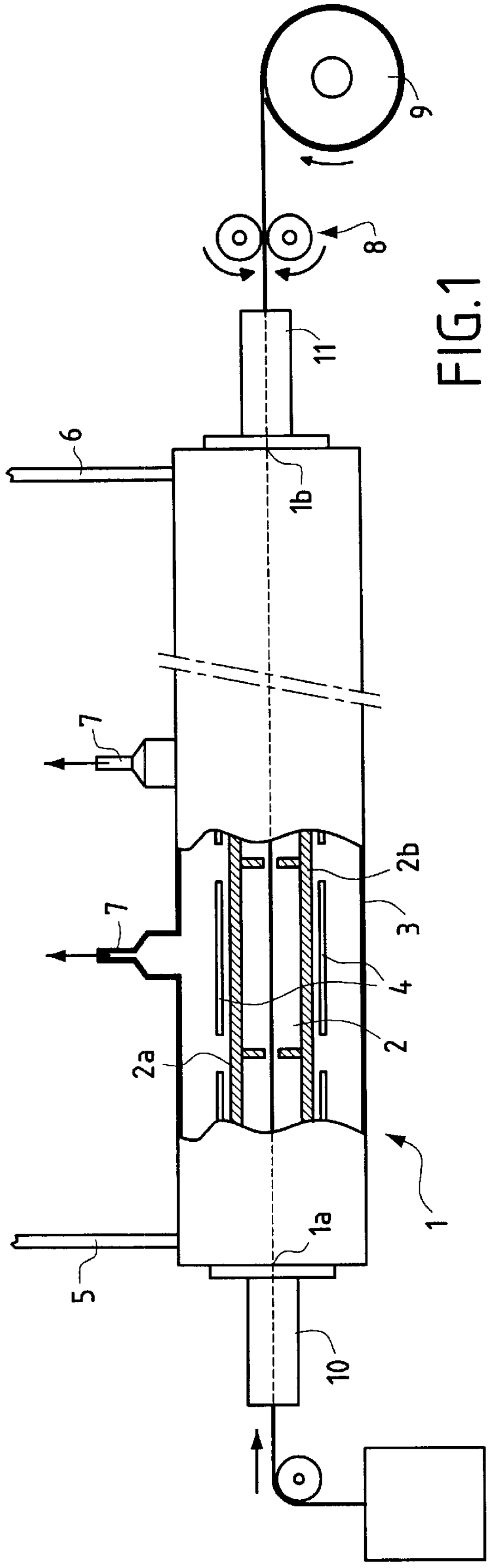
FIG. 1 is a highly diagrammatic view of a portion of an installation for continuously carbonizing cloth.

In the installation shown very diagrammatically in FIG. 1, a cloth T is carbonized by travelling continuously through a furnace 1. The cloth T, which has possibly been subjected to pre-treatment, is taken from a receptacle in which it was previously stored, for example in a loose pile.

The cloth T is made of carbon-precursor fibers, e.g. cellulose fibers. The pre-treatment of the cloth can consist in being impregnated with an organo-silicon compound enabling good mechanical properties to be conserved for the carbonized cloth. One such pre-treatment is described in particular in Russian patent No. RU 2 047 674.

The furnace 1 has a pyrolysis chamber 2 whose walls are made of graphite, for example, which chamber is received inside casing 3. The cross-section of the chamber 2 is in the form of a flat rectangle defining a passage for the cloth between a furnace inlet 1*a* and a furnace outlet 1*b*. Heating resistance elements 4 are placed on the outside faces of the top and bottom walls 2*a*, 2*b* of the pyrolysis chamber 2 inside the casing 3. Several sets of heating elements can be distributed in the longitudinal direction so as to define a succession of zones within the pyrolysis chamber that can be raised to different temperatures.

Pipes 5, 6 serve to feed the inside of the pyrolysis chamber 2 with an inert gas such as nitrogen in the vicinity of the longitudinal ends 1*a*, 1*b* of the furnace 1. The neutral gas, together with the gaseous pyrolysis effluent are extracted from the pyrolysis chamber via chimneys 7 distributed along the furnace 1.

The travel of the cloth through the furnace is controlled by a puller device 8 at the outlet from the furnace, and the resulting carbon fiber cloth is stored, for example by being wound on a reel 9. Carbonizing the cloth leads to a large amount of shrinkage, that can be as much as about 30% when using a cellulose precursor cloth that is carbonized while in the free state, without any tension being applied thereto. There therefore exists a relatively large difference in cloth speed between the inlet and the outlet of the furnace.

Sealing boxes 10, 11 have the cloth passing through them and are placed respectively at the inlet and at the outlet of the furnace 1 so as to prevent external air penetrating into the furnace and pyrolysis effluents from escaping from the furnace.

A furnace for continuously carbonizing cloth as briefly outlined above is known, e.g. from Russian patent No. RU 2 005 829.

An embodiment of the sealing box 10 situated at the inlet to the furnace 1 and in accordance with the present invention is described below in greater detail with reference to FIGS. 2 and 3.

The box 10 defines a longitudinal passage 12 for the cloth T between an end 12*a* that is upstream in the cloth travel direction, and a downstream end 12*b*. At the downstream end, the passage 12 is connected to the inlet of the pyrolysis chamber 2 of the furnace.

In the example shown, the box 10 is formed by a base or anvil 14 which defines a horizontal support surface 14*a* for the cloth travelling through the passage 12, and by a cover 16 having a top wall 16*a* and side walls 16*b* which define the passage 12. At its downstream end, the cover has an end wall 18 which co-operates with the base 14 to define an outlet slot 20 through which the cloth leaves the box 10. The end wall 18 extends above the cover 16 and is connected via a horizontal axis hinge 22 to the casing 3. A sealing gasket 19 is compressed between the wall 18 and the casing 3 when the cover 16 is closed. The base 14 has a rim 14*b* at its downstream end fixed to the casing 3 with a sealing gasket 15 being interposed therebetween. The sealing box 10 contains static sealing means 30 and dynamic sealing means 40.

The static sealing means 30 comprise an inflatable gasket 32 which extends across the passage 12 in the vicinity of the downstream end 12*b*. The gasket 32 is formed by a strip of flexible material fixed along its edges to a base member 34 and co-operating therewith to define a volume 36. The base member 34 is itself fixed to the cover 16 with a sealing spacer 35 being interposed between them. The gasket 32 can be preinflated, or it can be provided with an inflation gas feed pipe 38, e.g. for feeding nitrogen.

The pressure of the gasket 32 on the cloth T travelling over the support surface 14*a* must be limited, as must the friction between the gasket and the cloth so as to avoid imparting tension forces to the cloth which, because of the large amounts of shrinkage during carbonization, could give rise to excessive deformation of the weft yarns in the resulting carbon fiber cloth.

For this purpose, the pressure in the gasket 32, i.e. inside the volume 36, exceeds atmospheric pressure by an amount that is less than 500 Pa, and that preferably lies in the range 0 Pa to 50 Pa. When the cover is closed, the gasket 32 flattens out onto the cloth T (FIGS. 2 and 3). In addition, the material from which the gasket is made is selected so as to minimize friction with the cloth. By way of example, it can be made of a silicone-coated cloth. Other materials could be used, such as cloth coated in polytetrafluoroethylene or an elastomer membrane, e.g. a silicone membrane.

In the example shown, the dynamic sealing means 40 comprise chambers 42, 44, 46 situated in the passage 12 between its upstream end 12*a* and the inflatable gasket 32.

An inert gas, e.g. nitrogen, is injected into the chambers 42 and 46 via respective pipes 52, 56 passing through the cover 16 and opening out into the passage 12. The inert gas is extracted from the chamber 44 situated between the chambers 42 and 46 by means of a suction pipe 54 passing through the cover 16 and opening out into the passage 12.

The chambers are defined by metal walls 62, 64, 66 which extend across the passage 12. The wall 62 is situated close to the upstream end 12*a* and co-operates with the wall 64 to define the injection chamber 42. The extraction chamber 44 is defined by the walls 64 and 66, while the injection chamber 46 is defined by the wall 66 and the gasket 32.

The walls 62, 64, 66 are fixed to the cover 16 and they are applied in leaktight manner thereto along their top edges. Along their bottom edges, the walls 62, 64, 66 are provided with respective bibs 72, 74, 76 which just touch the surface of the cloth T. The bibs 72, 74, 76 are made of a material that is identical or similar to that of the gasket 32, e.g. a silicone-coated cloth. It should be observed that the bibs 72, 74, 76 do not exert any pressure on the cloth T and therefore do not impart any tension therein.

The chambers 42, 44, 46 provide an effective barrier to outside air entering. The inert gas injected into the chamber 46 adjacent to the inflatable gasket 32 is taken up by the extraction chamber 44. If a small fraction of this gas should reach the static gasket 32 it is not sufficient to disturb the flow of gases in the pyrolysis chamber and is merely added to the gas that is inserted via the pipe 5. The chambers 42 and 46 are preferably fed with inert gas at a rate that constitutes less than 10% of the total rate at which gas is injected into the furnace via the pipes 5 and 6.

Although the dynamic sealing means are described as being made with an inert gas extraction chamber situated between two injection chambers, other configurations are possible, for example it is possible to add one or more pairs of injection and extraction chambers, or to make do with a single injection chamber 46, the inert gas then being extracted through the inlet 12*a* of the passage 12.

Advantageously, the inflatable gasket 32 is protected from the radiant heat coming from the pyrolysis chamber 2 at the inlet to the furnace. For this purpose, one or more heat screens 80 extend across the end of the passage 12. By way of example, the screens 80 can be sheets of graphite fixed to the end wall of the cover, on the outside, with insulating spacers 82 being interposed between them, e.g. spacers made of ceramic.

At its downstream end, the box 10 engages in the upstream end of the pyrolysis chamber 2 via cross-bars 84, 86 of thermally insulating material, e.g. of ceramic or of refractory metal, which are fixed on the outside faces of the wall 18 and of the rim 14*b* and which engage between the top and bottom walls 2*a*, 2*b* of the chamber 2.

In the example shown, the sealing box 10 is in the form of a base surmounted by a pivoting cover. The cover can be driven by means of actuators 24. This disposition gives easy access to the passage 12 at the beginning of a carbonization cycle in order to insert the end of the cloth T. Naturally, other embodiments of the box could be provided, e.g. having a screw-on cover.

The description above relates to a sealing box 10 situated at the inlet of the furnace. The sealing box 11 situated at the outlet of the furnace can be made in similar manner, adopting a disposition that is symmetrical to that of the box 10 relative to the middle of the path followed by the cloth T through the furnace. Under such circumstances, the static inflatable sealing gasket in the box 11 is situated close to the outlet from the furnace, i.e. in the vicinity of the upstream end of the box 11 which is connected to the outlet from the furnace, while the dynamic sealing means are disposed downstream from the inflatable gasket.

The application of pressure to the cloth in the sealing box 11 is less critical than it is in the sealing box 10 since the cloth leaving the furnace has already been subjected to shrinkage. The static sealing gasket of the box 11 could therefore be constituted, in a variant, as a conventional roller or bib, and the dynamic sealing means could be omitted.

Figure 3:
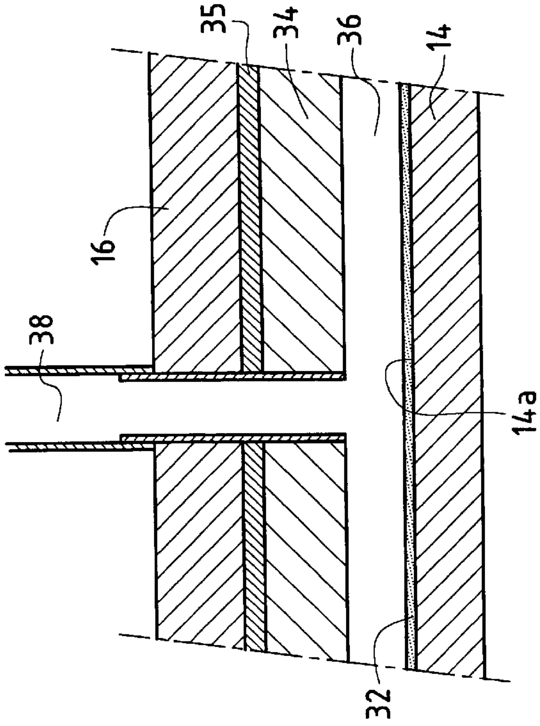
FIG. 3 is a fragmentary cross-section view on plane III—III of FIG. 2.
Figure 4:
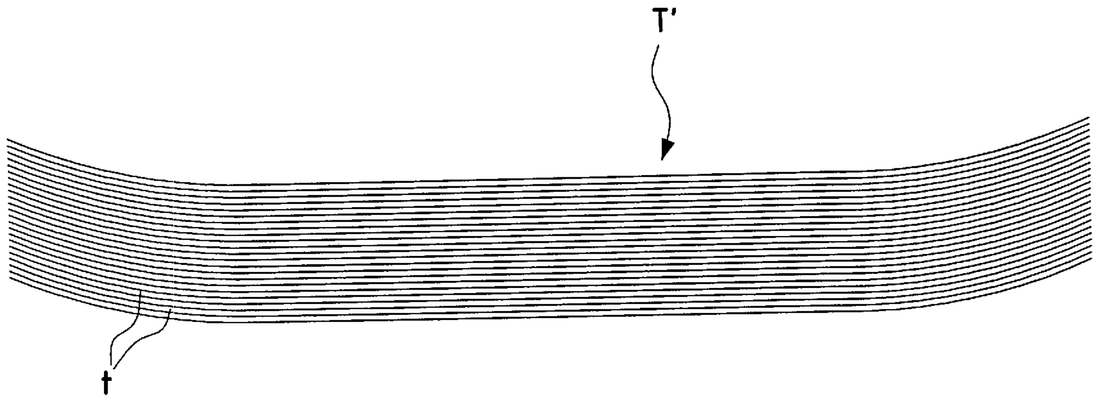
FIG. 4 is a fragmentary view of cloth that is out of register.

A continuous carbonizing installation with sealing boxes at the inlet and at the outlet of the furnace, of the type shown in FIGS. 3 and 4, has been used for carbonizing rayon cloth having a satin weave. The pressure in the static inflatable sealing gasket was set to 10 Pa above atmospheric pressure. The low tension induced in the cloth gave rise to shrinkage in the warp direction of 27% whereas shrinkage in the weft direction was substantially equal to the maximum potential for shrinkage exhibited by the cloth under no tension, being about 30%.

Figure 5:
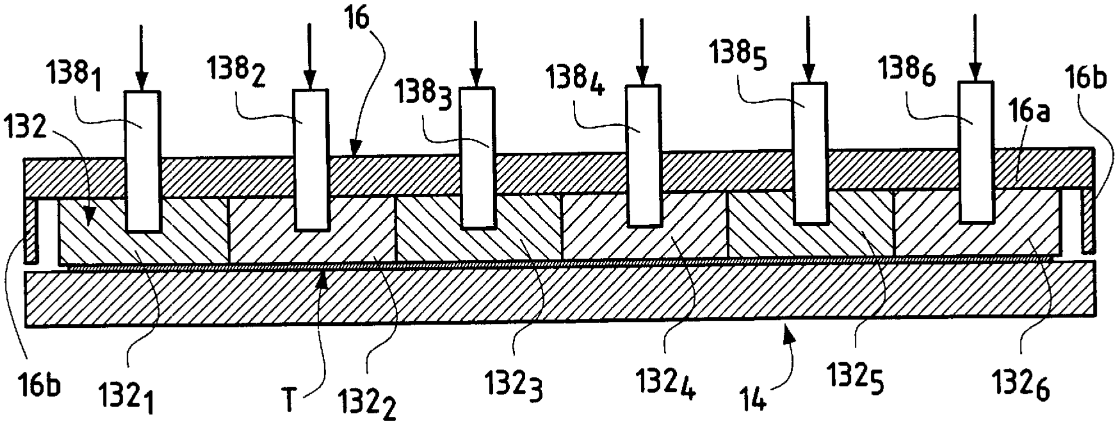
FIG. 5 is a highly diagrammatic cross-section view of a variant embodiment of an inflatable gasket in a sealing box of the invention.

A variant embodiment of the sealing box 10 at the inlet to the carbonizing furnace is described below with reference to FIGS. 4 and 5.

FIG. 4 shows a particular type of deformation that can occur in the cloth T' of carbon fibers, due to lack of uniformity in the temperature of the furnace in the transverse direction, i.e. across the width of the furnace, or due to non-uniform shrinkage of the cloth during carbonization, or due to poor quality stitching for joining widths of cloth together. Such out-of-register deformation gives rise to the weft t of the cloth being deformed.

It is possible to correct this deformation in order to reestablish a straight grain for the cloth by braking certain portions of the warp of the cloth (not shown in FIG. 4) more than other portions, prior to allowing the cloth to enter into the furnace. The warp portions that are subjected to greater braking are subjected to less shrinkage, which can compensate for weft deformation.

Figure 2:
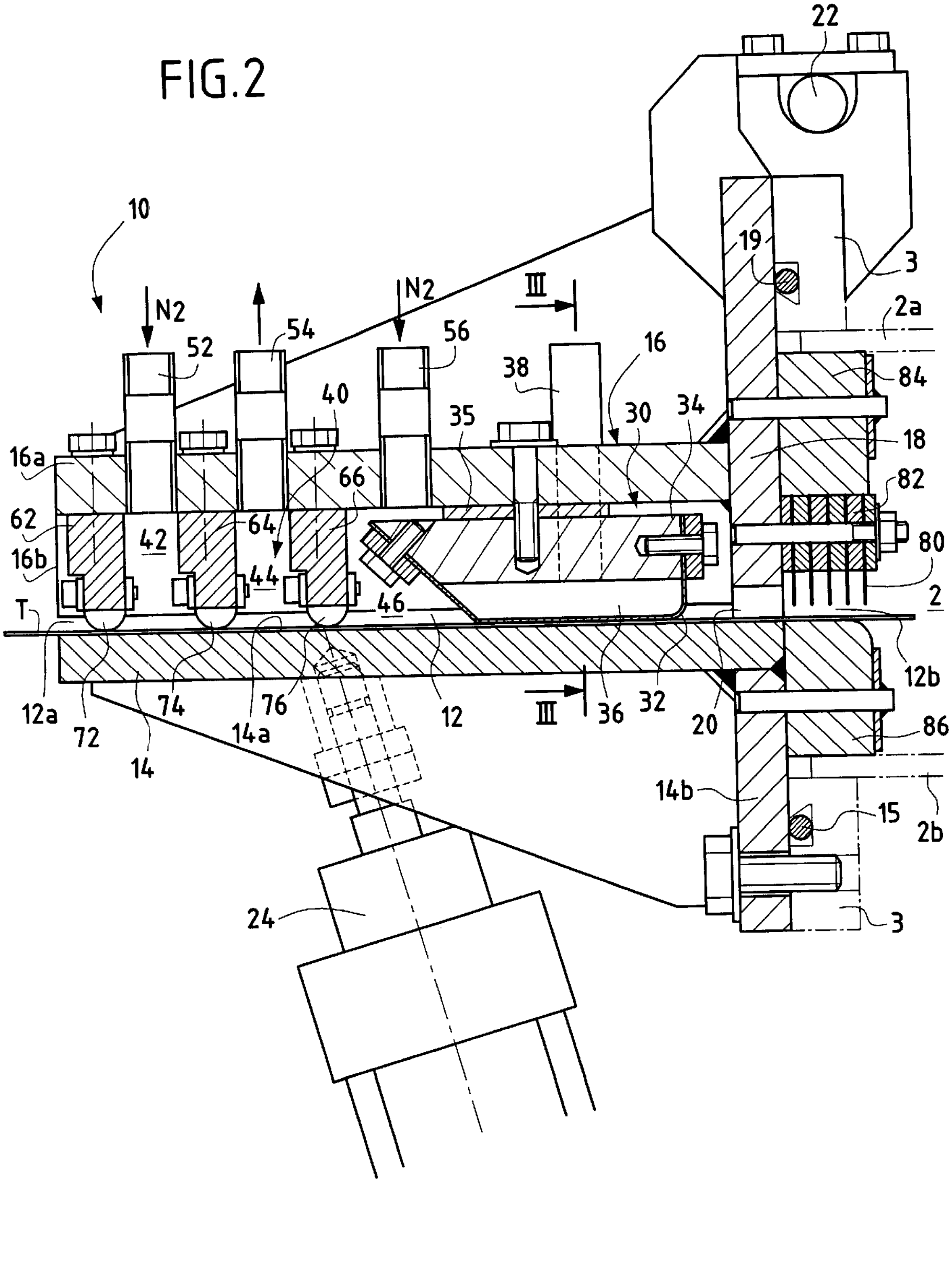
FIG. 2 is a longitudinal section view through an embodiment of a sealing box of the invention for the furnace of the FIG. 1 installation.

Differential action can be applied to the warp portions of the cloth by means of a sealing box which differs from that shown in FIGS. 2 and 3 in that the static sealing means are constituted by an inflatable gasket 132 (FIG. 5) that is subdivided into a plurality of adjacent sections $\mathbf{132}_1$, $\mathbf{132}_2$, . . . , $\mathbf{132}_6$ forming a line extending in the transverse direction. Each gasket segment is fed with inflation gas via a particular respective feed pipe $\mathbf{138}_1$, $\mathbf{138}_2$, . . . , $\mathbf{138}_6$ passing through the cover 16. By selectively controlling the pressures in the sections of the gasket, adjustable amounts of force are applied to different portions of the warp of the cloth T travelling over the base 14. The pressures are adjusted on the basis of the registering error, if any, observed on the cloth leaving the furnace.

Such means for controlling the straightness of the grain of the carbon fiber cloth are particularly advantageous in terms of simplicity and bulk, when compared with well-known systems using sets of bias rollers and curved rollers that are servo-controlled in position and in rotation.

What is claimed is:

1. A sealing box for an enclosure in an installation for continuously treating a strip product, the box comprising:

a longitudinal passage opening out from the box via a first end for connection to an inlet or an outlet of the enclosure, and via a second end, opposite from the first;

a support surface inside the passage, on which a strip product (T) can travel between the ends of the box; and static sealing means acting by coming into contact with the strip product traveling along the passage on the support surface;

the box being characterized in that:

the static sealing means comprise at least one inflatable gasket placed across the passage, above the support surface; and dynamic sealing means are also provided in the passage between one of the first and second ends of the box and the static sealing means, the dynamic sealing means comprising means for injecting gas into at least one chamber formed in the passage.

2. A sealing box according to claim 1, characterized in that the inflatable gasket is inflated to a pressure that exceeds atmospheric pressure by less than 500 Pa.

3. A sealing box according to claim 2, characterized in that the inflatable gasket is connected to a gas feed pipe.

4. A sealing box according to claim 2, characterized in that it has means for injecting gas into a chamber defined by the inflatable gasket and by a wall extending across the passage.

5. An installation for continuously carbonizing a strip of fiber substrate, the installation comprising a furnace provided, at least at its inlet, with a sealing box according to claim 2.

6. A sealing box according to claim 1, characterized in that the inflatable gasket is connected to a gas feed pipe.

7. A sealing box according to claim 6, characterized in that it has means for injecting gas into a chamber defined by the inflatable gasket and by a wall extending across the passage.

8. A sealing box according to claim 7, characterized in that:

dynamic sealing means comprise a plurality of adjacent chambers that are separated from one another by walls extending across the passage, each chamber being provided with a respective gas injection or extraction opening;

it has at least one extraction chamber situated between two injection chambers;

the or each wall defining a chamber is provided with a flexible bib at its end adjacent to the path followed by cloth along the passage;

at least one heat screen is interposed between the inflatable gasket and the first end of the box;

it comprises a base forming said support surface, and a cover together defining said passage;

the inflatable gasket is in the form of a plurality of adjacent sections placed side by side across the passage, each section being provided with respective inflation means so as to enable the inflation pressure in each section of the gasket to be adjusted independently.

9. An installation for continuously carbonizing a strip of fiber substrate, the installation comprising a furnace provided, at least at its inlet, with a sealing box according to claim 8.

10. An installation for continuously carbonizing a strip of fiber substrate, the installation comprising a furnace provided, at least at its inlet, with a sealing box according to claim 6.

11. A sealing box according to claim 1, characterized in that it has means for injecting gas into a chamber defined by the inflatable gasket and by a wall extending across the passage.

12. A sealing box according to claim 11, characterized in that the or each wall defining a chamber is provided with a flexible bib at its end adjacent to the path followed by cloth along the passage.

13. An installation for continuously carbonizing a strip of fiber substrate, the installation comprising a furnace provided, at least at its inlet, with a sealing box according to claim 11.

14. A sealing box according to claim 1, characterized in that dynamic sealing means comprise a plurality of adjacent chambers that are separated from one another by walls extending across the passage, each chamber being provided with a respective gas injection or extraction opening.

15. A sealing box according to claim 14, characterized in that it has at least one extraction chamber situated between two injection chambers.

16. A sealing box according to claim 1, characterized in that at least one heat screen is interposed between the inflatable gasket and the first end of the box.

17. A sealing box according to claim 1, characterized in that it comprises a base forming said support surface, and a cover together defining said passage.

18. A sealing box according to claim 17, characterized in that the cover is hinged relative to the base.

19. A sealing box according to claim 1, characterized in that the inflatable gasket is in the form of a plurality of adjacent sections placed side by side across the passage, each section being provided with respective inflation means so as to enable the inflation pressure in each section of the gasket to be adjusted independently.

20. A method of controlling the straightness of the grain of carbon fiber cloth coming from a furnace in a continuous carbonizing installation provided at the inlet of the furnace with a sealing box according to claim 19, the method being characterized in that the inflation pressures of the flexible gasket sections are controlled selectively as a function of any registering inaccuracy in the cloth.

21. An installation or continuously carbonizing a strip of fiber substrate, the installation comprising a furnace provided, at least at its inlet, with a sealing box according to claim 1.

* * * * *

UNITED STATES PATENT AND TRADEMARK OFFICE
CERTIFICATE OF CORRECTION

PATENT NO. : 6,561,799 B2
DATED : May 13, 2003
INVENTOR(S) : Yvan Baudry et al.

It is certified that error appears in the above-identified patent and that said Letters Patent is hereby corrected as shown below:

Title page,
Item [73], Assignee, "Snecma" should read -- SNECMA --; and

Column 8,
Line 50, "or" should read -- for --.

Signed and Sealed this

Twenty-fourth Day of February, 2004

JON W. DUDAS
*Acting Director of the United States Patent and Trademark Office*